United States Patent
Conrad et al.

(10) Patent No.: US 6,217,635 B1
(45) Date of Patent: Apr. 17, 2001

(54) METHOD AND APPARATUS FOR CONCENTRATING A GAS USING A SINGLE STAGE ADSORPTION CHAMBER

(75) Inventors: Wayne Ernest Conrad; Helmut Gerhard Conrad; Ted Szylowiec, all of Hampton (CA)

(73) Assignee: Fantom Technologies Inc., Welland (CA)

(*) Notice: Subject to any disclaimer, the term of this patent is extended or adjusted under 35 U.S.C. 154(b) by 0 days.

(21) Appl. No.: 09/270,110

(22) Filed: Mar. 16, 1999

Related U.S. Application Data (63) Continuation-in-part of application No. 09/240,618, filed on Feb. 1, 1999.

(30) Foreign Application Priority Data

Nov. 9, 1998 (CA) .................................................. 2253693

(51) Int. Cl.[7] .............................................. B01D 53/053
(52) U.S. Cl. ........................... 95/97; 95/98; 95/105; 95/130; 96/130; 96/144
(58) Field of Search ............................ 95/96–106, 130, 95/138; 96/108, 130, 143, 144

(56) References Cited

U.S. PATENT DOCUMENTS

| | | | |
|---|---|---|---|
| 3,572,008 | * 3/1971 | Hankison et al. ................. | 96/144 X |
| 3,659,399 | * 5/1972 | Kauer, Jr. et al. ................. | 96/130 X |
| 3,796,022 | * 3/1974 | Simon et al. ....................... | 95/130 X |
| 3,841,353 | 10/1974 | Acomb ................................ | 137/630 |
| 4,013,429 | * 3/1977 | Sircar et al. ....................... | 95/130 X |
| 4,033,375 | 7/1977 | Hirsch ............................... | 137/493.9 |
| 4,089,344 | 5/1978 | Flaschar et al. ..................... | 137/491 |
| 4,181,146 | 1/1980 | Goglio ............................... | 137/493.9 |
| 4,302,224 | 11/1981 | McCombs et al. ................... | 55/160 |
| 4,317,467 | 3/1982 | Heyland .............................. | 137/493 |
| 4,331,455 | 5/1982 | Sato ................................... | 55/21 |
| 4,342,573 | 8/1982 | McCombs et al. ................... | 55/161 |
| 4,448,592 | 5/1984 | Linde ................................. | 55/68 |
| 4,477,264 | * 10/1984 | Kratz et al. ....................... | 95/130 X |
| 4,534,346 | * 8/1985 | Schlaechter ........................ | 96/144 X |
| 4,561,865 | * 12/1985 | McCombs et al. ................. | 95/130 X |
| 4,576,616 | 3/1986 | Mottram et al. ..................... | 55/68 |
| 4,636,226 | * 1/1987 | Canfora ............................. | 96/130 X |
| 4,661,125 | 4/1987 | Haruna et al. ...................... | 55/26 |
| 4,853,015 | 8/1989 | Yoshino ............................. | 62/40 |
| 4,869,733 | 9/1989 | Stanford ............................. | 55/21 |
| 4,892,566 | * 1/1990 | Bansal et al. ...................... | 95/130 X |
| 4,973,339 | 11/1990 | Bansal ............................... | 55/31 |
| 5,282,492 | 2/1994 | Angeli ............................... | 137/493.4 |
| 5,346,291 | 9/1994 | Marsh et al. ....................... | 303/28 |
| 5,354,361 | 10/1994 | Coffield ............................. | 95/103 |
| 5,458,677 | * 10/1995 | VanderMolen ..................... | 96/144 X |
| 5,518,526 | * 5/1996 | Baksh et al. ....................... | 95/130 X |
| 5,520,720 | * 5/1996 | Lemcoff ............................. | 95/130 X |
| 5,529,607 | * 6/1996 | Tan ................................... | 95/130 X |
| 5,679,134 | * 10/1997 | Brugerolle et al. ................. | 95/130 X |
| 5,694,977 | 12/1997 | Clark ................................. | 137/467 |
| 5,766,310 | 6/1998 | Cramer .............................. | 95/96 |
| 5,772,737 | * 6/1998 | Andreani et al. ................... | 95/130 X |
| 5,785,740 | * 7/1998 | Brugerolle et al. ................. | 95/130 X |
| 5,882,380 | * 3/1999 | Sircar ................................. | 95/130 X |
| 5,928,610 | * 7/1999 | Moran et al. ....................... | 95/130 X |
| 5,961,694 | * 10/1999 | Monereau et al. ................. | 95/130 X |
| 5,997,611 | * 12/1999 | Doong et al. ....................... | 95/130 X |

\* cited by examiner

*Primary Examiner*—Robert H. Spitzer
(74) *Attorney, Agent, or Firm*—Philip C. Mendes da Costa; Bereskin & Parr (57) ABSTRACT

A method and apparatus for operating a pressure swing adsorption process is disclosed that may utilize only a single adsorption stage yet still produce a continuous stream of a concentrated fluid. A portion of the enriched fluid produced during the adsorption cycle in an adsorption chamber is used to purge the adsorption chamber.

35 Claims, 8 Drawing Sheets

METHOD AND APPARATUS FOR CONCENTRATING A GAS USING A SINGLE STAGE ADSORPTION CHAMBER

This application is a continuation-in-part application of application Ser. No. 09/240,618, filed on Feb. 1, 1999.

FIELD OF THE INVENTION

This invention relates to a method and apparatus using a single adsorption zone for producing an enriched stream of a first gas from a stream containing the first gas and at least one second gas. In one embodiment, the method and apparatus may be used to obtain a concentrated stream of oxygen from air.

BACKGROUND OF THE INVENTION

Various different methods have been developed for separating gases and producing a concentrated stream of a selected gas. One particular method which has been used in industry is the pressure swing adsorption process. Generally, these processes use an adsorbent which, under elevated pressure conditions, preferentially adsorbs a targeted gas over other gases present in a gas stream. Accordingly, the adsorbent could be selected to preferentially adsorb an undesirable gas from a gas stream thereby leaving a gas stream having an increased concentration of the gases remaining in the gas stream. An example of such a process would be the use of a pressure swing adsorption process to produce an oxygen enriched air stream. The adsorbent would be selected to preferentially adsorb nitrogen over oxygen. Thus, after the adsorption process is conducted, the pressurized air in contact with the adsorbent contains a higher percentage by volume of oxygen. This oxygen enriched air may then be vented from the adsorption chamber and the adsorbent purged (at reduced pressure conditions) to remove the adsorbed nitrogen. Alternately, such a process may be used to preferentially adsorb a targeted gas (e.g. oxygen) thereby also producing an enriched stream of oxygen.

Various different processes have been designed to utilize the selective adsorption ability of zeolite. Examples of these include, Bansal (U.S. Pat. No. 4,973,339), Stanford (U.S. Pat. No. 4,869,733) and Haruna et al (U.S. Pat. No. 4,661,125).

The process and apparatus of Bansal, Stanford and Haruna et al each utilize two adsorption chambers. The use of two adsorption chambers is undesirable as it unnecessarily complicates the apparatus since it requires additional valving and control means to cycle each adsorption bed through a pressurization cycle and a purging cycle. Further, this adds to the cost of the apparatus and decreases the reliability of the apparatus.

Other disadvantages of existing designs is the requirement to use expensive valve control means. In particular, solenoids are frequently required to switch the adsorption chamber from a pressurization mode to a purging mode. These controls are expensive and also prone to failure after extensive use.

Further, existing designs utilize electronics (e.g. microprocessors) to control the cycling of the adsorption chamber. This adds to the cost of the equipment and also requires an electrical power source to operate the process. Further, the electronic components may be damaged in harsh environments and this limits the applications of some existing designs.

SUMMARY OF THE INVENTION

In accordance with the instant invention, a portion of the enriched fluid produced in an adsorption chamber is used to purge the adsorbed fluid from the adsorption chamber. Thus only a single source of motive force (i.e. the source for pressurizing the adsorption chamber for operating the adsorption cycle) is required. According, the construction of the contactor is simplified and the reliability of the unit may be increased.

To this end, in accordance with the instant invention there is provided a fluid concentrator for obtaining an enriched stream of a first fluid from a fluid stream containing the first fluid and at least one second fluid, the concentrator comprising:

(a) an adsorption chamber having an inlet for introducing the fluid stream to the adsorption chamber, the adsorption chamber operable to produce the enriched stream during a first cycle and the adsorption chamber having an outlet for venting the enriched stream from the adsorption chamber;

(b) a pressurizable storage chamber positioned downstream from the adsorption chamber and in flow communication with the adsorption chamber for receiving at least a portion of the enriched fluid stream;

(c) at least one passageway connecting the adsorption chamber and the storage chamber in flow communication through at least one valve to provide a first flow rate of the enriched fluid in the downstream direction and a second flow rate of the enriched fluid upstream to the adsorption chamber;

(d) an enriched fluid outlet in flow communication with at least one passageway for delivering a portion of the enriched fluid stream downstream of the concentrator; and, (e) a purge valve in flow communication with the inlet of the adsorption chamber and moveable between a closed position and an open position in which the adsorption chamber is purged during a purging cycle whereby during the first cycle the enriched fluid stream travels in the downstream direction and during the purging cycle a portion of the enriched fluid stream travels in the upstream direction into the adsorption chamber.

The first flow rate may be greater than the second flow rate or, alternately, the second flow rate may be greater than the first flow rate.

In one embodiment, the fluid stream is at an elevated pressure when introduced to the adsorption chamber and the elevated pressure of the fluid stream provides essentially the only motive force to operate the concentrator.

In one embodiment, wherein the concentrator operates on a pressure differential in the adsorption chamber of 5 to 15 psig.

In another embodiment, the at least one valve comprises a venting valve moveable automatically from a first position in which the venting valve restricts the venting of the enriched fluid from the adsorption chamber into the passageway to a second position in which the venting valve vents the enriched fluid from the adsorption chamber into the passageway at an increased rate when the pressure in the adsorption chamber reaches a preset level.

In another embodiment, the at least one valve seals the adsorption chamber from the at least one passageway when the differential pressure between the adsorption chamber and the passageway is less than a preset level.

In another embodiment, the venting valve moves automatically from a first position in which the venting valve restricts the venting of the enriched fluid from the adsorption chamber into the passageway to a second position in which the venting valve vents the enriched fluid from the adsorption chamber into the passageway at an increased rate when the pressure in the adsorption chamber reaches a first preset level. Preferably, the venting valve seals the adsorption chamber from the passageway when the differential pressure between the adsorption chamber and the passageway is less than the first preset level. Further, the venting valve is preferably automatically moveable to a third position in which the venting valve vents enriched fluid from the passageway to the adsorption chamber when the pressure differential between the adsorption chamber and the passageway is less than a second preset level.

The storage chamber may be part of the passage way. Alternately, the storage chamber and the outlet may be separately in flow communication with the venting valve. The storage chamber is preferably drivingly connected to the purge valve (eg. by a mechanical linkage) whereby the storage chamber automatically causes the purge valve to be moved to the open position when the pressure within the storage container reaches a preset pressure. The storage chamber may be expandable due to the pressure of the enriched fluid provided thereto to automatically commence the purge cycle when the storage container reaches a preset pressure.

The enriched fluid outlet may have a flow restrictor associated therewith (eg an aperture or it may be a narrower diameter passage) whereby the pressure within the storage chamber is pressurized when the adsorption chamber vents enriched fluid into the passageway.

In accordance with the instant invention there is also provided a pressure swing adsorption apparatus for producing an enriched fluid stream of a first fluid from a stream containing the first fluid and at least one second fluid, the apparatus including:

(a) reversible adsorption means for reversibly adsorbing the at least one second fluid to produce the enriched fluid stream;

(b) pressurizable storage means for receiving and storing a portion of the enriched fluid stream;

(c) outlet means in flow communication with the adsorption means for venting a portion of the enriched fluid stream from the apparatus;

(d) valve means for alternately providing a first flow rate of the enriched fluid stream downstream from the adsorption means to pressurize the pressurizable storage means, and a second flow rate of the enriched fluid stream upstream into the adsorption means to purge the adsorption means;

(e) purging means for removing at least a portion of the at least one second fluid from the reversible adsorption means when the valve means is providing the second flow rate of the enriched fluid stream into the adsorption means.

In accordance with the instant invention there is also provided a method for producing an enriched fluid stream having an increased concentration of a first fluid from a fluid stream containing the first fluid and at least one second fluid comprising the steps of:

(a) the step of introducing the fluid stream into a vessel containing a member for adsorbing the at least one second fluid;

(b) the step of pressurizing the vessel for a time sufficient for the member to adsorb at least a portion of the at least one second fluid to produce the enriched fluid stream;

(c) the step of venting enriched fluid at a first flow rate from the vessel;

(d) the step of using a portion of the enriched fluid vented from the vessel to pressurize a pressurizable storage container; and, (e) the step of purging the vessel with enriched fluid stored in the pressurizable storage container.

In one embodiment, the method further comprises the step of introducing a pressurized fluid stream into the vessel whereby the pressure of the fluid stream is sole motive force for operating the method.

In another embodiment, the method further comprises the step of automatically venting enriched fluid from the vessel when the vessel reaches a first preset pressure.

In another embodiment, the method further comprises the step of automatically purging the vessel when the pressurizable storage container reaches a second preset pressure.

In another embodiment, the method further comprises the step of automatically providing enriched fluid from the pressurizable storage container to the vessel when the pressurizable storage container reaches the second preset pressure.

In another embodiment, the method further comprises the step of expanding the storage container as the storage container is pressurized.

An advantage of the instant invention is that the expansion of the storage container (i.e. the reservoir for storing enriched gas) may be used to actuate the purging cycle when the storage container expands to a desired level. Accordingly, an electronic controller is not required to time the process. Further, no gas sensors are required to determine when to actuate a particular part of the cycle of the adsorption chamber.

A further advantage of the instant invention is that the storage container may be drivingly linked to the purging valve. In this embodiment, simple actuation means may be used to move the purging valve to the open position so as to initiate the purging cycle. Accordingly, solenoids and other complicated switching apparatus are not required.

Further, the storage container may be operatively connected to the purge valve by mechanical linkages and, in addition, the purge valve may be a simple mechanical valve (e.g. a seat valve). Accordingly, no electrical power supply is required to initiate the purging cycle.

It will be appreciated that, according to the instant invention, a concentrator, and in a preferred embodiment an oxygen concentrator, may be designed wherein a source of pressurized gas (eg. air) which is fed to the adsorption chamber is the driving source of the entire apparatus. Accordingly, the resultant device, which uses only an external motive force, may be manufactured as a lightweight reliable unit.

In accordance with the instant invention, the apparatus may be designed to trigger the end of the purging cycle and thereby commence the pressurization (adsorption) cycle as the expandable storage container contracts to a pre-determined position. This position may be pre-determined based upon the volume of the adsorption chamber and the time required to complete the purging cycle as well as the flow rate of enriched gas from the reservoir.

Further, the apparatus is energy efficient since the timing of the cycles is based upon the actual completion of a cycle (i.e. the contraction of the expandable reservoir) as opposed to an electronic timing means which would initiate a cycle regardless of the concentration of the enriched gas exiting the apparatus.

BRIEF DESCRIPTION OF THE DRAWINGS

These and other advantages of the instant invention will be more fully and particularly understood in connection with the following description of a preferred embodiment of the invention in which:

FIG. 6b is a more detailed view illustrating in diagrammatic form the valve between the adsorption chamber and the passageway of FIG. 6a;

DESCRIPTION OF PREFERRED EMBODIMENT

Figure 1:
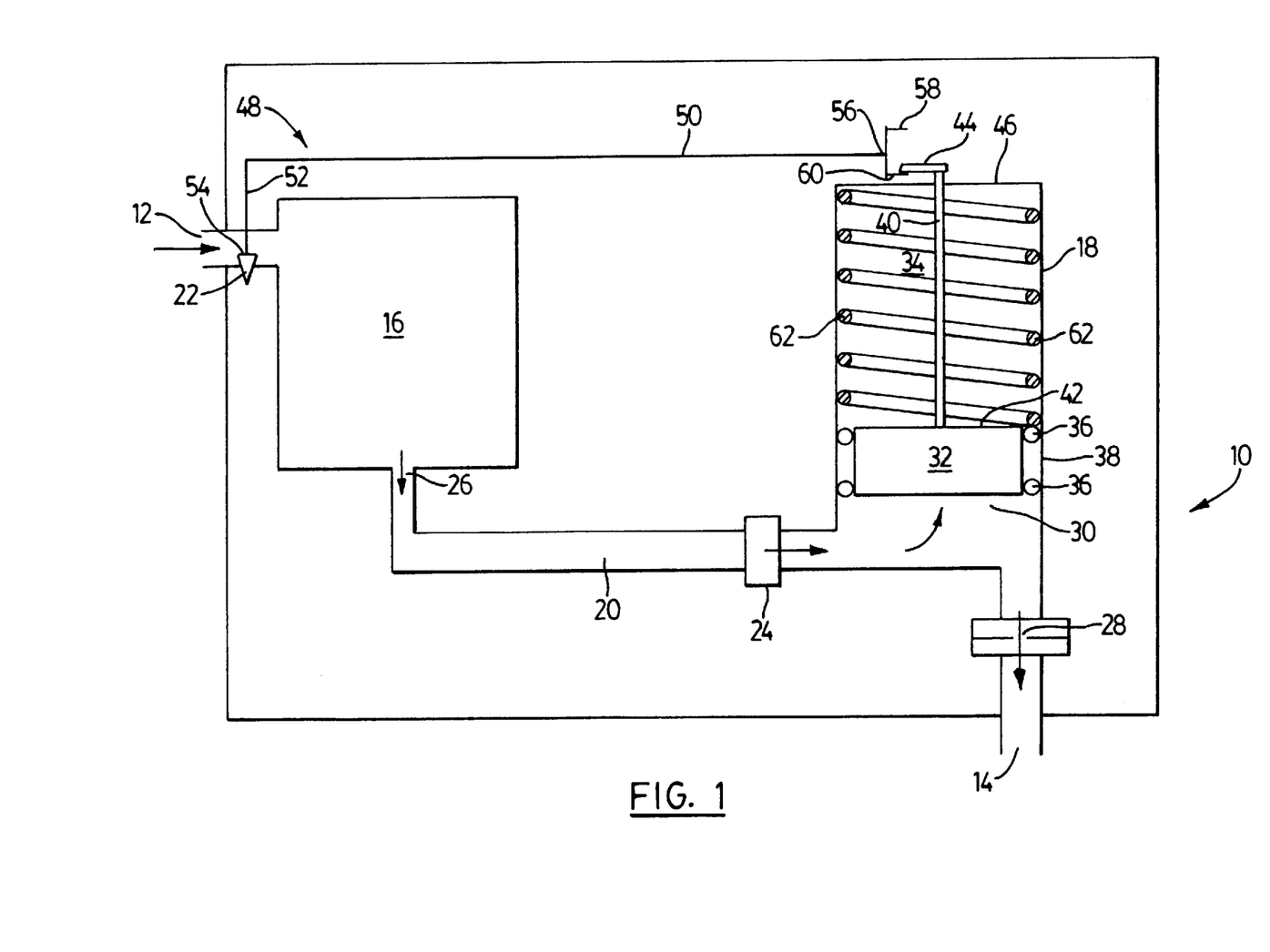
FIG. 1 is a view illustrating in diagrammatic form an apparatus according to the instant invention wherein the adsorption chamber is supplying enriched gas to the container.

Concentrator 10 comprises inlet passage 12, outlet passage 14, adsorption chamber 16 and container 18. Passageway 20 extends between adsorption chamber 16 and container 18. Concentrator 10 is provided with purge valve 22 and valve 24.

Adsorption chamber 16 may be of any particular construction which is known in the art for pressure swing adsorption apparatus. In the preferred embodiment, the adsorption chamber 16 comprises a vessel distinct from container 18 that may be subjected to an increased pressure during which a selected fluid is adsorbed into adsorption media provided in adsorption chamber 16 leaving a fluid having an increased concentration of the remaining (unadsorbed) fluids in adsorption chamber 16. It will be appreciated that adsorption chamber 16 may comprise a bed containing the adsorbent material through which the fluid flows as it passes through adsorption chamber 16.

The fluid may be a liquid or a gas. If the fluid is a liquid, then concentrator 10 may be used, for example, to selectively remove an impurity from a liquid stream (eg. the fluid selectively adsorbed into carbon) such as water or a pesticide. The concentrator may also be used for pressure swing fractional distillation.

In a preferred embodiment, the fluid is a gas and, more preferably, the concentrator is an oxygen concentrator. The following description is based upon the use of concentrator 10 as an oxygen concentrator; however, the concentrator may be used for other pressure swing operations of fluids.

If concentrator 10 is an oxygen concentrator, then the feed gas which is introduced into adsorption chamber 16 via inlet passage 12 comprises an oxygen containing gas and, more preferably, air. The adsorbent material in adsorption chamber 16 accordingly comprises a material which selectively adsorbs nitrogen (the largest constituent of air) thereby leaving air containing an enriched level of oxygen in adsorption chamber 16. Such adsorbent material are known in the art. Examples of such material are zeolites and, in a particularly preferred embodiment, the adsorbent is clinoptilolite.

It will be appreciated that, in an alternate embodiment, the desired product may be the fluid adsorbed onto the adsorbent media. In such a case, the product exiting purge valve 22 could be fed to a container or other apparatus as may be desired.

The remaining part of this description of the preferred embodiment is premised upon concentrator 10 including an adsorbent to remove nitrogen from air thereby producing a stream of oxygen enriched air. It is to be understood that the feed gas stream fed to adsorption stream 16 may comprise at least any two gases and the adsorbent material may be selected to adsorb the one or more of such gases leaving a gas stream having an enhanced concentration of the remainder of such gases.

Adsorption chamber 16 operates under pressure. Accordingly, means must be provided to raise adsorption chamber 16 to the desired pressure. In the preferred embodiment, the air fed to inlet passage 12 comprises a stream of pressurized air (eg. at a pressure of 3 to 30 psig, preferably from 5 to 15 psig). It will be appreciated that, in an alternate embodiment, a compressor or other means may be provided as part of apparatus 10 to feed an air stream into adsorption chamber 16 and to pressurize adsorption chamber 16 to the required pressure. The exact pressure which is required for the adsorption media to adsorb the targeted gas, and the length of the adsorption cycle, will depend on the thermodynamics of the adsorption media.

Figure 4:
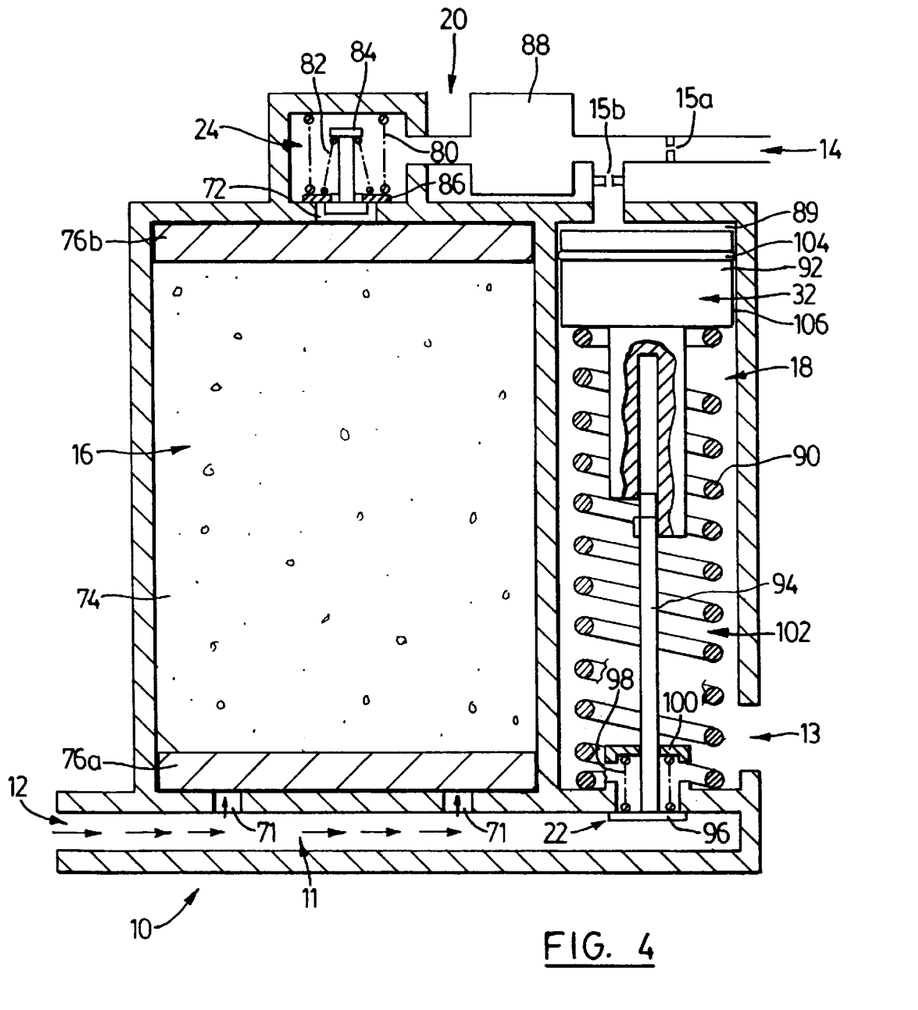
FIG. 4 is a view illustrating in diagrammatic form an alternate embodiment of the instant invention wherein the apparatus has commenced the adsorption cycle.
Figure 7A:
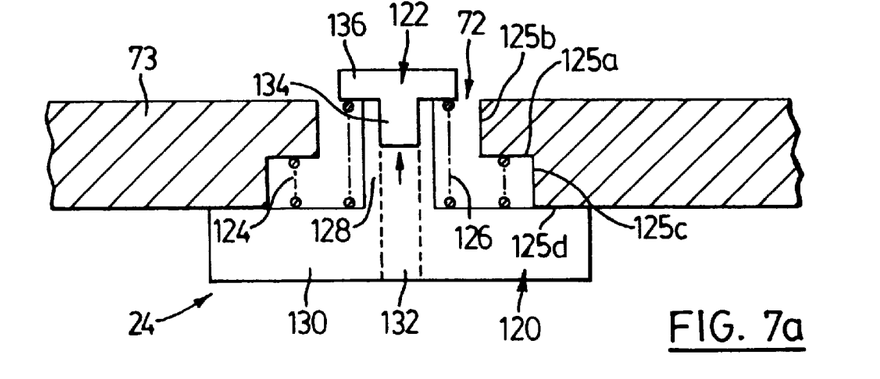
FIG. 7a is a cross-sectional view of an alternate embodiment of the valve between the adsorption chamber and the passageway of FIG. 4 when the concentrator is in the adsorption cycle.
Figure 8A:
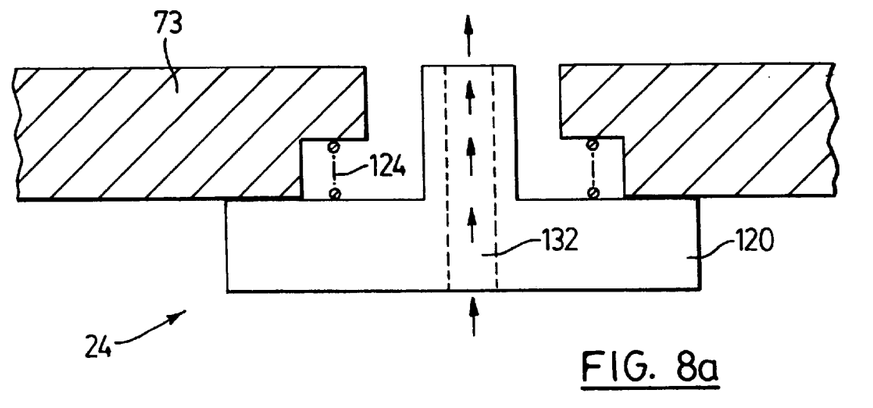
FIG. 8a is a cross-sectional view of another embodiment of the valve between the adsorption chamber and the passageway of FIG. 4 when the concentrator is in the adsorption cycle and is supplying oxygen enriched gas; and, FIG. 8b is a cross-sectional view of the valve of FIG. 8a when the concentrator is in the purge cycle.

Valve 24 is a venting valve which is provided in passageway 20 to alternately (i.e. cyclically), connect adsorption chamber 16 and container 18 in flow communication and to then isolate adsorption chamber 16 from container 18. Valve 24 may be any valve which is operable to provide a first flow rate of the enriched fluid from adsorption chamber 16 to container 18 and a second flow rate of the enriched fluid from container 18 to adsorption chamber 16. Preferred examples of valve 24 are shown in FIGS. 4, 7a and 8a. Further, valve 24 may be positioned at any point between the two vessels. For example, valve 24 could be positioned as part of outlet port 26 of adsorption chamber 16. Further, if adsorption chamber 16 and container 18 are a single unit separated by a wall (see FIG. 4), valve 24 may be positioned in the wall.

While adsorption chamber 16 is undergoing the adsorption portion of the cycle, adsorption chamber 16 is sealed sufficiently such that adsorption chamber 16 will be raised to the required pressure. It will be appreciated that valve 24 may allow some gas to exit therethrough so as to provide a more continuous flow of gas through outlet passage 14 (see for example valve 24 shown in FIG. 8a). Preferably, no gas flow out of adsorption chamber 16 is permitted during this part of the method (see for example valve 24 in FIG. 4). Accordingly purge valve 22 is preferably in the fully closed position shown in FIG. 1 and valve 24 is preferably in the fully closed position shown in FIG. 4. Adsorption chamber 16 is thus isolated so as to allow pressure to build up therein.

Due to the inflow of air through inlet passage 12, pressure will build up in adsorption chamber 16 and nitrogen will be adsorbed in the adsorbent media.

Based upon the volume of adsorption chamber 16, the adsorption characteristics of the adsorbent in adsorption chamber 16 and the rate of air input into adsorption chamber 16, the length of time required to achieve the desired concentration of oxygen in the free gas in adsorption chamber 16 may be calculated. Further, a person skilled in the art will be able to determine the pressure at which this desired oxygen concentration will be achieved.

Any valve mechanism (either mechanically or electrically operated) may be used for valve 24. Preferably, valve 24 is a pressure actuated member which will open to bring adsorption chamber 16 into flow communication with container 18 when adsorption chamber 16 reaches the pressure at which the required oxygen concentration will have been achieved (eg. a check valve). One advantage of this approach is that valve 24 may open, and the adsorption cycle therefore terminate, when a desired preset pressure is achieved. Thus no sensors are required to monitor the progress of the adsorption cycle. The adsorption cycle automatically terminates when the requisite pressure is reached. Preferably, valve 24 is a mechanical member which is biased (eg. by a spring 80) to the closed position and which will open when the pressure upstream thereof (i.e. in adsorption chamber 16 or in passageway 20) reaches a preset pressure (which may be the pressure at which the desired concentration of oxygen is achieved in the free gas in adsorption chamber 16).

When valve 24 is in the open position as represented in FIG. 1, oxygen enriched air will pass from adsorption chamber 16 through passageway 20 and into container 18.

Outlet passage 14 is in flow communication which container 18. In the preferred embodiment of FIG. 1, when valve 24 is in the open position, outlet passage 14 is also, indirectly, in flow communication with adsorption chamber 16. When valve 24 opens, container 18 expands so as to receive at least a portion of the oxygen enriched air which exits adsorption chamber 16. Accordingly, outlet passage 14 provides a flow of oxygen enriched air when valve 24 is open and the oxygen enriched air is passing into container 18. Further, when the purge cycle commences, valve 24 opens in the other direction (see FIG. 2) such that enriched air may be passed through valve 24 to purge or assist in purging adsorption chamber 16. Further, container 18 preferably will also have by then stored a sufficient supply of oxygen enriched air so that outlet passage 14 may still provide a flow of oxygen enriched air even while adsorption chamber 16 is undergoing a purge cycle. It will be appreciated that, in an alternate embodiment, chamber 16 and container 18 may be connected by two passageways with a check valve positioned in each passageway (one to permit flow downstream from chamber 16 to container 18 and the other to permit flow upstream from container 18 to chamber 16). Thus valve 24 may be replaced by two check valves.

As shown in FIG. 1, outlet passage 14 may have an aperture 28 which is open at all times when concentrator 10 is in operation. Aperture 28 is preferable of a pre-set opening size so as to provide a generally continuous flow of oxygen enriched air through outlet passage 14, at least while container 18 is being charged with enriched air. It will also be appreciated that, if desired, aperture 28 may have a variable opening size so as to vary the flow rate of oxygen enriched air through outlet passage 14. Further, aperture 28 may be operable so as to seal outlet passage 14 (or alternately a valve to close outlet passage 14 may be provided). This may be desirable if, for example there is back pressure from downstream equipment.

Container 18 and aperture 28 may be sized so that outlet 14 provides a continuous flow of oxygen enriched air during both the adsorption cycle (i.e. while adsorption zone is being pressurized and while container 18 is being charged with enriched air) and the purge cycle of adsorption chamber 16. To this end, outlet passage 14 preferably has a reduced flow rate of gas therethrough than the flow rate of air into adsorption chamber 16 via inlet passage 12. Preferably, the flow rate of gas through outlet passage 14 is about half that of the flow rate into inlet passage 12. This flow rate may be achieved by, for example, selecting the cross sectional area of outlet passage 14 or including a flow restriction, such as aperture 28, in outlet passage 14, to achieve this result. It will be appreciated that two or more adsorption chambers 16 may be connected to one or more containers 18. A regulator could also be used to control the output rate from port 14.

Container 18 may be any storage container for storing a portion of the enriched air under pressure. This may be achieved by having a sufficient flow restriction on outlet passage 14 to cause pressure (and therefore gas) to build up in container 18. Alternately, or in addition, container 18 may have an expandable reservoir 30 for storing at least a portion of the oxygen enriched gas produced in adsorption chamber 16. In one preferred embodiment, container 18 may be a storage vessel having expandable walls. In this embodiment, container 18 may have at least one wall which will expand when container 18 is subjected to an increased pressure. For example, one or more of the walls of container 18 may be composed of an elastomeric material. Alternately, in another preferred embodiment, container 18 may have a flexible side wall which is movable between a first, compacted portion and a second expanded position when reservoir 30 is filled with oxygen enriched air. For example, container 18 may be in the shape of a bellows.

Figure 2:
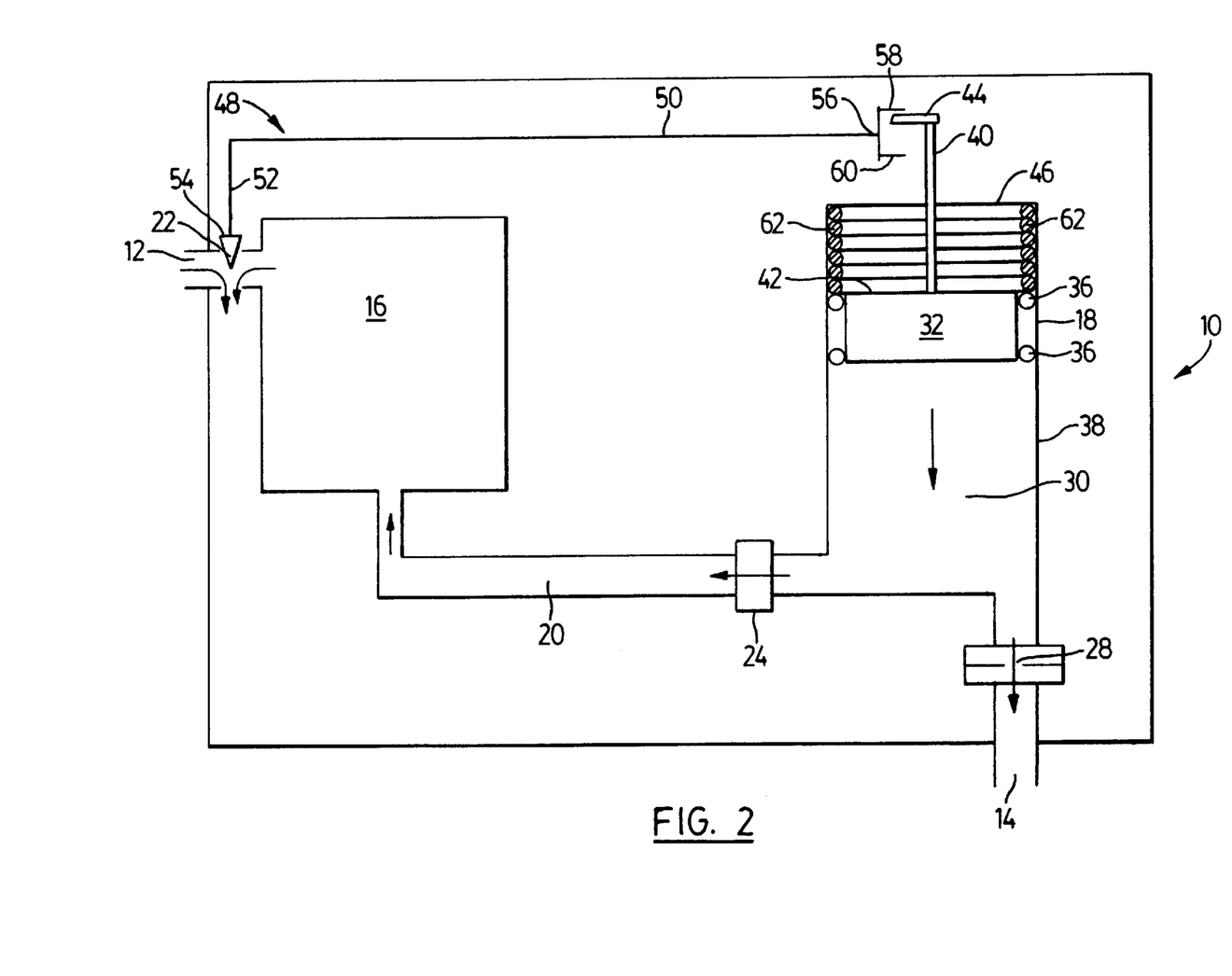
FIG. 2 is a further view illustrating in diagrammatic form the apparatus of FIG. 1 wherein the apparatus has commenced the purging cycle.

Alternately, or in addition, container 18 may comprise a vessel having a movable member mounted therein and movable between a first position and a second position. The size of reservoir 30 increases as the movable member moves from the first position to the second position. An example of such a construction is shown in FIGS. 1 and 2. In these Figures, the movable member comprises piston 32.

In the embodiment of FIGS. 1 and 2, container 18 is a longitudinally extending member and, is preferably vertically oriented. Piston 32 may be movably mounted in container 18 by any means known in the art. Further, piston 32, and the means for movably mounting piston 32 in container 18, preferably isolate reservoir 30 from upper portion 34 of container 18. In this way, the oxygen enriched gas which enters container 18 will remain in reservoir 30 instead of passing upwardly by piston 32 to upper portion 34. Piston 32 preferably moves upwardly into upper portion 34 of container 18 due solely to a pressure of the oxygen enriched stream passing through valve 24. Piston 32 may be so mounted by a plurality of O-rings 36 which are positioned between piston 32 and side wall 38 of container 18. The O-rings, in conjunction which piston 32 seal reservoir 30 from upper portion 34. However, it will be appreciated that other means, such as a bellows, bearings or a cam may be used to movably mount piston 32.

When the adsorption cycle of adsorption chamber 16 is completed, valve 24 will preferably open from the fully closed position allowing a stream of oxygen enriched air to pass into container 18 (or, if valve 24 allows some air to pass therethrough during the adsorption cycle, allowing an increased flow rate of oxygen enriched air to pass into container 18). At this time, piston 32 may be in approximately the position shown in FIG. 1 (i.e. in a contracted position towards the bottom of container 18). Oxygen enriched air will enter container 18 and pass through aperture 28 through outlet passage 14. However, as the flow of oxygen enriched air through aperture 28 is restricted, pressure will build up in container 18 which will force piston 32 into upper portion 34. As additional oxygen enriched air enters container 18, the pressure will be maintained in container 18 and piston 32 will continue to move into upper portion 34, for example until the position shown in FIG. 2 is reached.

As oxygen enriched air exits adsorption chamber 16, the pressure in adsorption chamber 16 will decrease. For example, the pressure in adsorption chamber 16 may reach 20 to 30 psig at the end of an adsorption cycle. As the pressure is reduced, nitrogen will commence being released by the zeolite thus decreasing the concentration of oxygen in the air exiting adsorption chamber 16. At this time, it is desirable to purge the zeolite in adsorption chamber 16. Advantageously, in one embodiment of the instant invention, the purge cycle may be commenced automatically at the end of the charge cycle.

At the end of the purge cycle, the pressure in adsorption chamber 16 may have been reduced to a pressure from about atmosphere to about 5 psig. Thus concentrator 10 may operate with a pressure swing between the peak pressure of the adsorption cycle and the low pressure of the purge cycle of 5 to 15 psig and, preferably 10 psig.

In particular, apparatus 10 may include an actuator which drivingly connects the container (e.g. piston 32) to purge valve 22 whereby movement of piston 32 from a first contracted position (as shown in FIG. 1) to a second expanded position (as shown in FIG. 2) actuates the purge valve to move it to the open position. As the flow rate of oxygen enriched air through aperture 28 may be predetermined and as the volume of container 18 is predetermined, a person skilled in the art may determine the distance through which piston 32 will travel as the oxygen enriched air exits adsorption chamber 16. By designing container 18 so as to permit piston 32 to move this distance, piston 32 may be in the upper position shown in FIG. 2 when the oxygen enriched air has been vented from adsorption chamber 16 and the pressure in adsorption chamber 16 has been reduced to a point wherein it is desirable to purge adsorption chamber 16.

Preferably, piston 32 is drivingly connected to purge valve 22 so as to actuate purge valve 22 when piston 32 is in the upper position shown in FIG. 2. At that time, purge valve 22 will be in the open position allowing air to exit therethrough (as shown in FIG. 2). When purge valve 22 opens, the pressure in passage way 20 will drop to a sufficient degree such that valve 24 (which is preferably pressure operated) will open to permit oxygen enriched air in reservoir 30 to flow into adsorption chamber 16 to purge nitrogen from adsorption chamber 16 (see FIG. 6*b*).

The driving connection between piston 32 and purge valve 22 may be either mechanical or electrical but is preferably mechanical thus permitting automatic actuation of the purge cycle without the need for any electronic controls. As shown in FIGS. 1 and 2, extension member 40 extends upwardly from upper surface 42 of piston 32. Movable arm 44 is fixedly mounted to extension member 40. Accordingly, movable arm 44 moves longitudinal with respect to container 18 as piston 32 moves longitudinally within container 18. When piston 32 is in the contracted position shown in FIG. 1, moveable arm 44 is positioned adjacent surface 46 of container 18 and, when piston 32 is in the expanded position, as shown FIG. 2, moveable arm 44 is spaced a distance from surface 46 of container 18.

Movable arm 44 may be mechanically linked to purge valve 22 such as by connector member 48. Connector member 48 comprises a mechanical linkage which extends from movable arm 44 to purge valve 22. If container 18 extends vertically, then connector member 48 may have a first horizontal portion 50 and a second vertical portion 52 extending downwardly from the end of horizontal portion 50 distal to moveable arm 44. Connector member 48 has a first end 54 which is operatively connected to purge valve 22 and a second end 56 which is positioned to engage and be actuated by movable arm 44.

If container 18 is vertically disposed, then connector member 48 may be operatively engaged by movable arm 44 so as to move first end 54 upwardly as piston 32 moves upwardly and to move first end 54 downwardly as piston 32 moves downwardly. This may be achieved by having at least a first arm 58 provided on second end 56. As container 18 expands, piston 32 moves upwardly. At some point, movable arm 44 will engage first arm 58. Further movement of piston 32 will cause first arm 58 to move upwardly (due to its engagement with movable arm 44). As moveable arm 58 moves upwardly, purge valve 22 is moved to the open position. When purge valve 22 has been opened a sufficient amount of time, valve 24 opens in the opposite direction and adsorption chamber 16 will be purged. During this purging cycle, piston 32 will move downwardly into reservoir 30 thereby forcing oxygen enriched air through aperture 28 (if it remains open) and through valve 24 to adsorption chamber 16. The movement of piston 32 may be due to the pressure of gravity (if container 18 is vertically disposed). In addition, or alternately, a biasing member, such as spring 62 may urge piston 32 downwardly to the contracted position.

As air exits reservoir 30, piston 32 will move downwardly and, accordingly, arm 44 will move downwardly. If purge valve 22 is a vertically operable valve, then purge valve 22 may cause first arm 58 to move downwardly in conjunction with movable arm 44 (such as by the force of gravity and/or a biasing means urging purge valve 22 to the closed position) thus closing purge valve 22. Alternately, or in addition, second end 56 may have a second arm 60. In this embodiment, vertical portion 52 is a generally non-compressible member (eg. a rod) and as piston 32 moves downwardly, movable arm 44 will engage second arm 60 thereby driving first end 54 downwardly so as to close purge valve 22.

Preferably, connector member 48 moves essentially only due to movable arm 44 pushing up longitudinally outwardly on first arm 58 and longitudinally inwardly on second arm 60. Further, arms 58 and 60 are preferably spaced apart. In this way, piston 32 will move upwardly a defined amount before causing purge valve 22 to open thus allowing reservoir 30 to be filled a pre-set amount before the purge cycle commences. Further, piston 32 may move downwardly by a preset amount until it engages second arm 60 thereby closing purge valve 22 and completing the purging cycle. The distance between the arms is preferably sufficient to allow the purging cycle to be conducted while piston 32 is still pumping air from reservoir 30. In a particularly preferred embodiment, by the time piston 32 is in the contracted position shown in FIG. 1, purge valve 22 has been closed for a sufficient amount of time to allow adsorption chamber 16 to have reached the requisite pressure to have produced an oxygen enriched stream and to cause valve 24 to open in the charging direction (i.e. the direction to introduce enriched air into reservoir 30 from adsorption chamber 16.

In this embodiment, it may be seen that the actuator for purge valve 22 is a mechanical linkage comprising member 40, movable arm 44 and connector 48. Purge valve 22 is accordingly actuated by vertical movement of piston 32. Purge valve 22 is preferably a mechanical valve that is moved to the open position by vertical motion of connector 48. An example of such a valve is a seat valve which is lifted upwardly by upward motion of first end 54. However, other valves, such as a gate valve or a ball valve which may be opened to an open position by vertical motion of first end 54 may be utilized.

In an alternate embodiment, arms 44, 58 and 60 may define electrical connections and contact between arms 44 and 58 may actuate a circuit to open purge valve 22 and connection between arm 44 and arm 60 may consequentially close the circuit to close purge valve 22. For example, vertical portion 52 may be composed of a bimetal member or a muscle wire which contracts when heated. When movable arm 44 contacts first arm 58, an electrical connection may be made causing an electrical current to flow through vertical portion 52 thereby heating the vertical portion and causing it to contract. This contraction will cause purge valve 22 to open. When the electrical connection is broken (i.e. arm 44 is no longer in contact with first arm 58 or alternately the circuit is broken when movable arm 44 contacts second arm 60) the current flow through vertical portion 52 will be terminated thus allowing vertical portion 52 to cool and expand thereby sealing purge valve 22.

Figure 3:
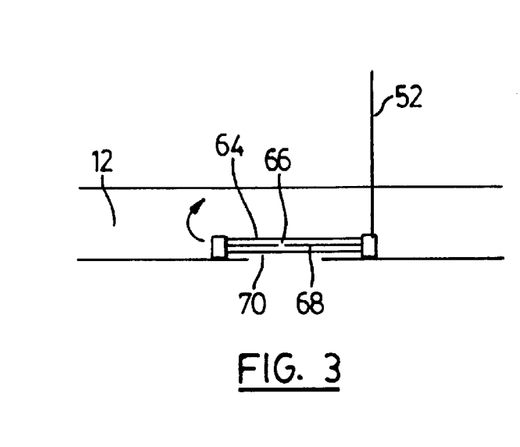
FIG. 3 is a schematic diagram of an alternate purge valve.

An alternate embodiment of purge valve 22 is shown in FIG. 3. In this embodiment, the purge valve comprises a bi-metal strip 64 having an outer metal member 66 affixed to an inner metal member 68. The two metals have different thermal coefficients of expansion. Accordingly, when contact is made between arms 44 and 58, an electrical connection may be made causing an electric current to pass, eg. via an electrically conductive member 48, to and through bi-metal strip 64 thereby heating the strip. If the inner metal member 68 has a greater thermal expansion than the outer metal member 66, the heating of bi-metal strip 64 will cause the bi-metal strip 64 to bend inwardly in the direction of arrow A thereby uncovering opening 70 so that the purge cycle may begin. When movable arm 44 engages arm 60, or brakes contact with first arm 58, the circuit may be closed causing the electric heating current to terminate and allowing bi-metal strip 64 to cool. When bi-metal strip 64 cools, inner metal member 68 will contract more than the outer metal member 66 thereby causing the bi-metal strip to curve downwardly and close opening 70. In an alternate embodiment, it will be appreciated that bi-metal strips 64 may be positioned on the outside passage 12.

In a further alternate embodiment, valve 22 may be actuated by a solenoid. Once again, contact between movable arm 44 and first arm 58 may complete an electric circuit so as to actuate a solenoid to open any desired valve which may function as a purge valve. When movable arm 44 engages arm 60, or brakes contact with first arm 58, the circuit may be closed causing the solenoid to move to its starting position thereby closing the purge valve.

Figure 5:
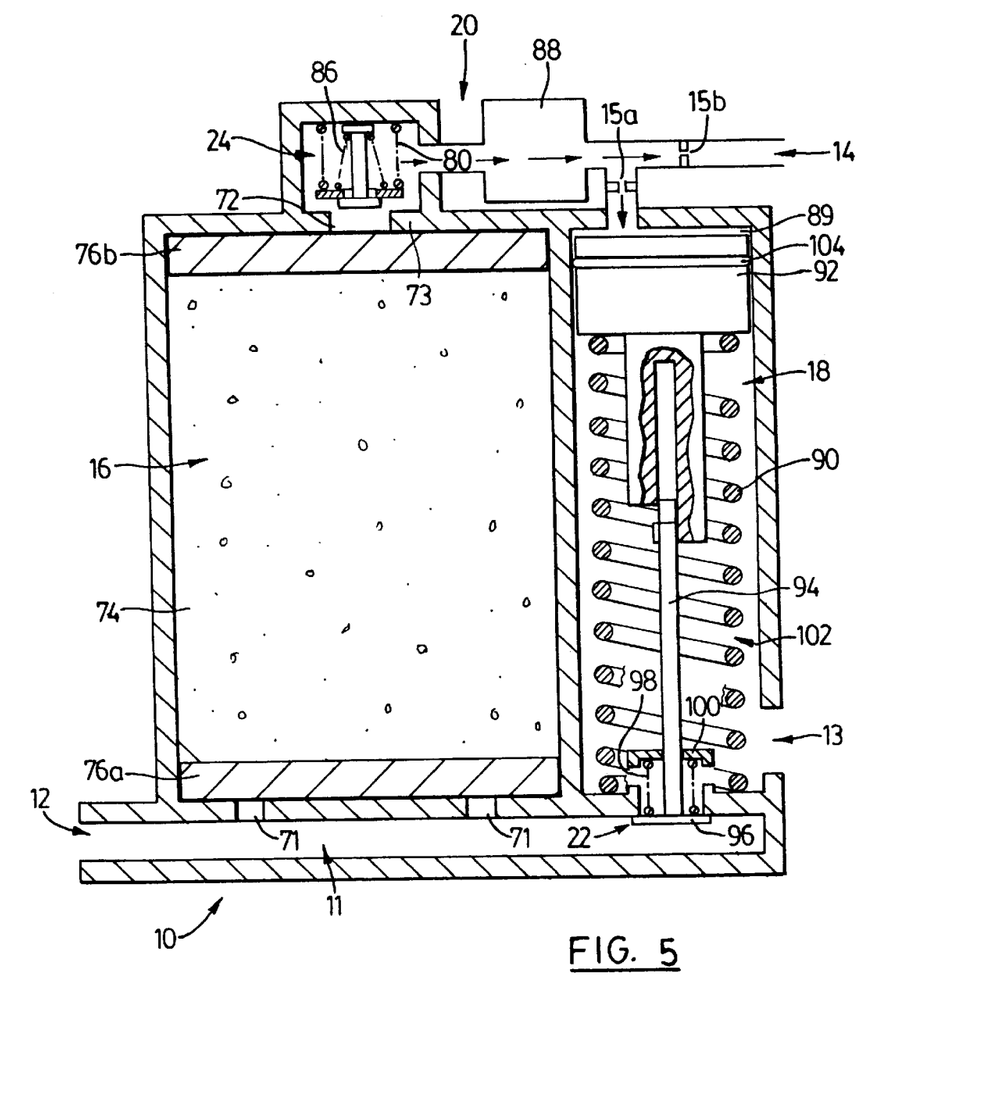
FIG. 5 is a view illustrating in diagrammatic form the apparatus of FIG. 4 wherein the apparatus has commenced the supplying of enriched gas.
Figure 6A:
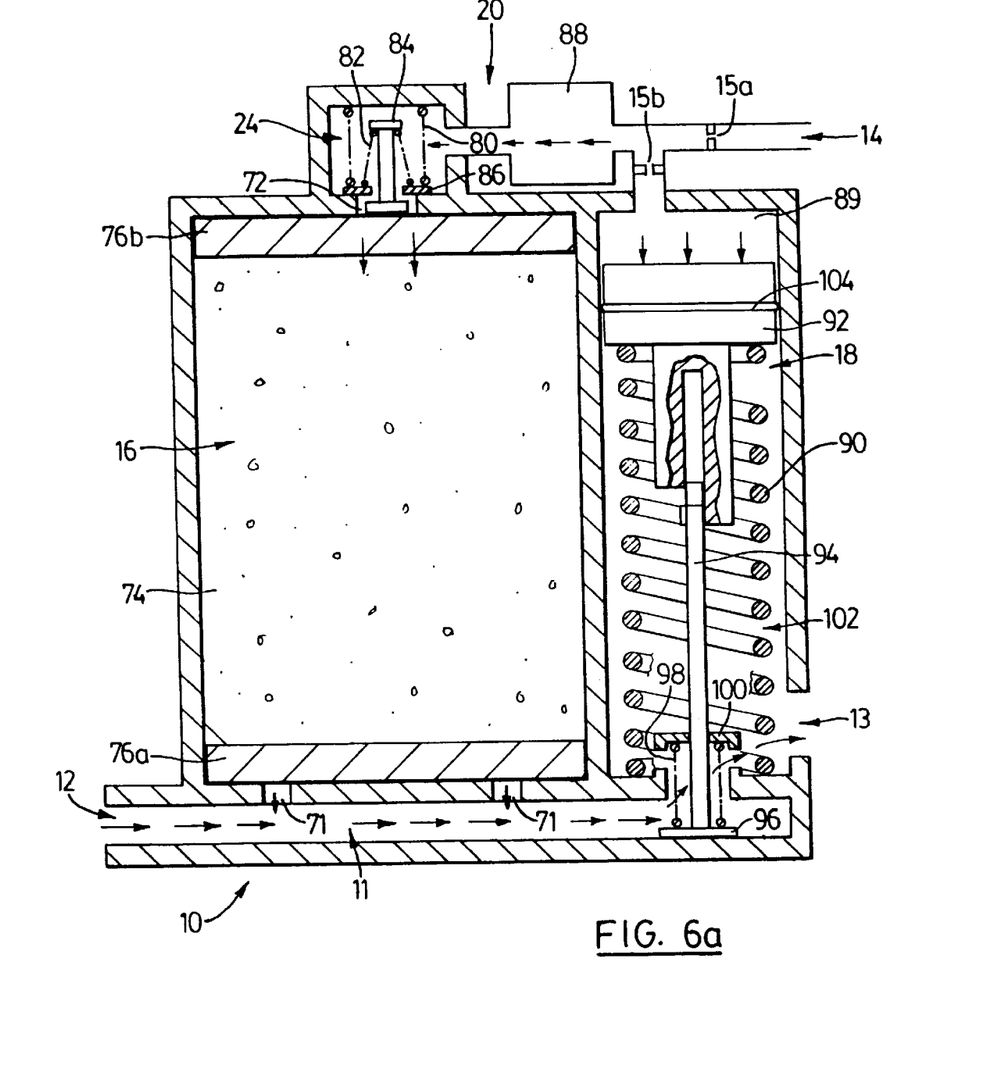
FIG. 6a is a view illustrating in diagrammatic form the apparatus of FIG. 4 wherein the apparatus has commenced the purge cycle.
Figure 6B:
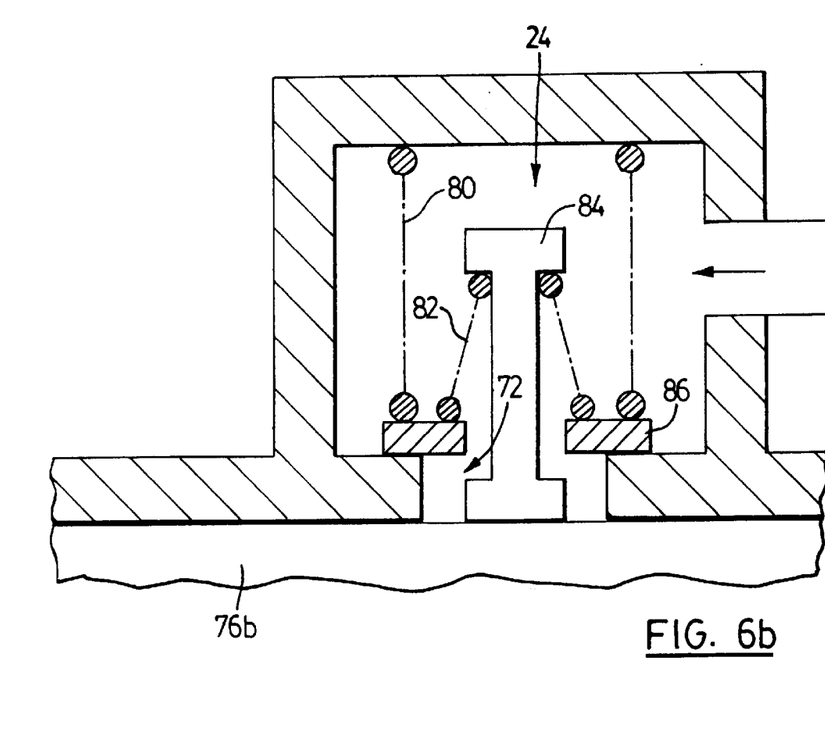

As previously described, concentrator 10 passes through three distinct cycles, namely an adsorption cycle, a charging cycle, and a purge cycle, which will be more particularly described in relation to FIGS. 4, 5, and 6, respectively which show an alternate preferred embodiment.

Referring first to FIG. 4, concentrator 10 is shown in its adsorption cycle during which nitrogen from an air feed stream is adsorbed into adsorption media provided in adsorption chamber 16 leaving a fluid having an increased concentration of nitrogen in adsorption chamber 16.

Adsorption chamber 16 communicates with inlet channel 11 through adsorption inlet 71 such that a feed gas stream passing into inlet passage 12 flows through adsorption inlet 71. Further, inlet channel 11 communicates with purge outlet 13 through purge valve 22. Accordingly, a feed gas stream passing into inlet passage 12 can also be provided to purge outlet 13 when purge valve 22 is open such that inlet channel 11 is in flow communication with container 18.

Adsorption chamber 16 also includes foam or porous sections 76a, 76b which are positioned within adsorption chamber 16 to retain the adsorbent therein. The feed gas stream which is fed into adsorption chamber 16 through adsorption inlet 71 will pass through foam section 76a and that the gas flow out of an adsorption outlet 72 will pass through foam section 76b as shown.

Valve 24 is a two-way valve which allows a degree of flow communication between adsorption chamber 16 and container 18, depending upon the pressure differential between the adsorption chamber 16 and the passageway 20. Valve 24 is associated with adsorption outlet 72 of a common wall 73 between adsorption chamber 16 and passageway 20. The embodiment of valve 24 shown in FIG. 4 comprises an outer spring 80, inner spring 82, plug 84 and annular ring 86. Outer spring 80 is coupled between the top wall of passageway 20 and the top surface of annular ring 86 such that annular ring 86 is biased against the top surface of common wall 73 of adsorption chamber 16. Inner spring 82 is coupled between plug 84 and the top surface of annular ring 86 so that plug 84 is biased against the bottom surface of annular ring 86.

Accordingly, valve 24 is moveable between a first position in which adsorption chamber 16 is isolated from container 18, a second position wherein gas flow passes from adsorption chamber 16 to passageway 20, and a third position wherein a reverse gas flow passes from passageway 20 to adsorption chamber 16. Accordingly, valve 24 is a two-way pressure actuated member which will enter into one of the first, second and third positions depending on the differential pressure present between adsorption chamber 16 and passageway 20 in association with a number of preset system parameters (eg. the resistance of outer spring 80 and inner spring 82).

Purge valve 22 is a one-way valve which is moveable between a first position in which inlet channel 11 is isolated from purge outlet 13 and a second position in which inlet channel 11 is in gas flow communication with purge outlet 13. The specific mechanics which move purge valve 22 from one position to another may be any of those discussed with respect to FIGS. 1 and 2.

In the preferred embodiment of FIG. 4, while adsorption chamber 16 is undergoing the adsorption cycle, valve 24 remains in the first position wherein adsorption chamber 16 is isolated from container 18. Due to the inflow of air through inlet passage 12, pressure will build up in adsorption chamber 16 and nitrogen will be adsorbed in the adsorbent media of bed 74.

Further, in the preferred embodiment of FIG. 4, container 18 includes piston 32 and spring 90. Piston 32 includes a piston head 92, piston base 94 and piston foot 96, all of which are rigidly coupled together. Piston 32 may be movably mounted in container 18 by any means known in the art.

Piston head 92, and the means for movably mounting piston 32 in container 18, serve to isolate reservoir 89 from bottom portion 102 of container 18. In this way, oxygen enriched gas which enters container 18 will remain in reservoir 89 instead of passing upwardly by piston head 92 to bottom portion 102. Piston head 92 may be so mounted by one or more O-rings 104 which are positioned between piston head 92 and side wall 106 of container 18 to seal reservoir 89 from bottom portion 102.

Piston base 94 and piston foot 96 are also adapted to function as part of purge valve 22. Purge valve 22 includes spring 98 which is coupled between the top surface of platform 100 (which itself is fixed in position in container 18) and the top surface of piston foot 96. Accordingly, piston foot 96 is spring biased to the first (e.g. closed) position shown in FIG. 4 and will open when the pressure in reservoir 89 exceeds the force exerted by springs 98 on piston foot 96.

Since outlet passage 14 is open at all times when concentrator 10 is in operation, the dimensions of flow restrictors 15a, 15b and the volume of container 18 may be chosen so that the concentrator provides a generally continuous flow of oxygen enriched air through outlet passage 14 during the charging cycles and, alternately, during all three cycles. This necessitates that outlet passage 14 have a reduced flow rate of gas therethrough than the flow rate of air into adsorption chamber 16 via inlet passage 12.

When pressure within adsorption chamber 16 reaches the pressure at which the desired oxygen concentration will have been achieved, the pressure at adsorption outlet 72 on the bottom surfaces of annular ring 86 and plug 84 will be enough to overcome the combined resistance of outer and inner springs 80 and 82. Accordingly, valve 24 will move from the adsorption position (FIG. 4) to the charging position (FIG. 5).

Passageway 20 also includes volume chamber 88 and is in open flow communication with both container 18 and outlet passage 14 through flow restrictors 15a and 15b. The specific dimensions of flow restrictors 15a and 15b may be chosen so that optimal gas flows are provided into container 18 and through outlet passage 14.

When valve 24 moves to its second (charging) position, valve 24 provides flow communication between adsorption chamber 16 and passageway 20 such that oxygen enriched air is provided along passageway 20 through volume chamber 88 and through flow restrictor 15b to outlet passage 14 and through flow restrictor 15a to container 18. At this time, piston 32 may be in approximately the position shown in FIG. 5 (i.e. in a contracted position towards the top of container 18). Oxygen enriched air will enter container 18 through flow restrictor 15a and flow out of outlet passage 14 through flow restrictor 15b. However, as the flow of oxygen enriched air through flow restrictor 15b is restricted, pressure will build up in container 18 which will force piston 32 towards bottom portion 102. As additional oxygen enriched air enters expandable reservoir 89 of container 18, the pressure will be maintained in container 18 and piston 32 will continue to move into bottom portion 102, for example until the position shown in FIG. 6a is reached (i.e. the pressure on the top surface of piston head 92 is sufficient to overcome the resistance of springs 90 and 98 and the pressure from inlet channel 11 against the bottom surface of piston foot 96). Due to the flow restrictors, volume chamber 88 (if provided) will also pressurize to provide an additional reservoir of enriched air for the purge cycle.

FIG. 6a shows concentrator 10 in its purge cycle during which the nitrogen rich air is purged from adsorption chamber 16 through adsorption inlet 71 into inlet channel 11 and through purge valve 22 to purge outlet 13.

When purge valve 22 is at least partially open, air in inlet channel 11 is allowed to exit therethrough (as shown in FIG. 6a) thus bypassing adsorption chamber 16. When purge valve 22 is open, the pressure in inlet channel 11 and within adsorption chamber 16 will drop to a sufficient degree such that the differential pressure between adsorption chamber 16 and passageway 20 will cause valve 24 to move from its second position where gas flow passes from adsorption chamber 16 to passageway 20, into its third (purge) position where enriched air passes from passageway 20 to adsorption chamber 16.

Specifically, when the pressure in adsorption chamber 16 reaches a low enough level as compared to the pressure within passageway 20, outer spring 80 will bias annular ring 86 against the floor of valve 24 over adsorption outlet 72 as shown. Further, at this point the force exerted on the top surface of plug 84 will be enough to overcome the resistance of inner spring 82 such that plug 84 is biased away from the floor of valve 24 towards foam 76b so that a passageway is provided for gas flowing from passageway 20 into adsorption chamber 16 (as shown in more detail in FIG. 6b), through adsorption inlet 71, out to purge outlet 13, through inlet channel 11 and purge valve 22 thereby removing the nitrogen which was releasably adsorbed by the adsorption media of bed 74 from concentrator 10. This embodiment provides for a reverse gas flow from, eg., volume chamber 88 and reservoir 89 into adsorption chamber 16 to assist with the purging cycle.

When purge valve 22 has been opened a sufficient amount of time for the purge cycle to be completed, the pressures within adsorption chamber 16 and passageway 20 will start to equalize such that valve 24 moves from its third position (FIG. 6b) to its first position (FIG. 4) whereby the adsorption cycle recommences.

It should be noted that as the relative strength of outer spring 80 combined with inner spring 82 will always be greater than the strength of inner spring 82 alone, it will always take a greater pressure differential to move valve 24 from its first position to its second position then to move valve 24 from its second position to its third position. The relative ratio between these two pressure differentials can be adjusted by suitably choosing the resistance values of outer spring 80 and inner spring 82.

Further, since outlet passage 14 is open at all times, it may be desirable to design flow restrictors 15a, 15b, the volume of reservoir 89, and other system dimensions and spring strengths so as to provide a generally continuous flow of oxygen enriched air through outlet passage 14.

Accordingly, it will be appreciated that container 18 is pressurizable (eg. by having an outlet producing a back pressure sufficient to allow pressure to build up in a container 18 having fixed walls or by having at least a portion of one wall of container 18 moveable in response to the pressure build up in container 18). The enriched air in container 18 provides a source of air to purge, or assist in purging, adsorption chamber 16. Further, and more preferably, the pressure increase in container 18 is used to trigger the start of the purge cycle at the end of the charge cycle without any electronic monitoring or controls.

Figure 7B:
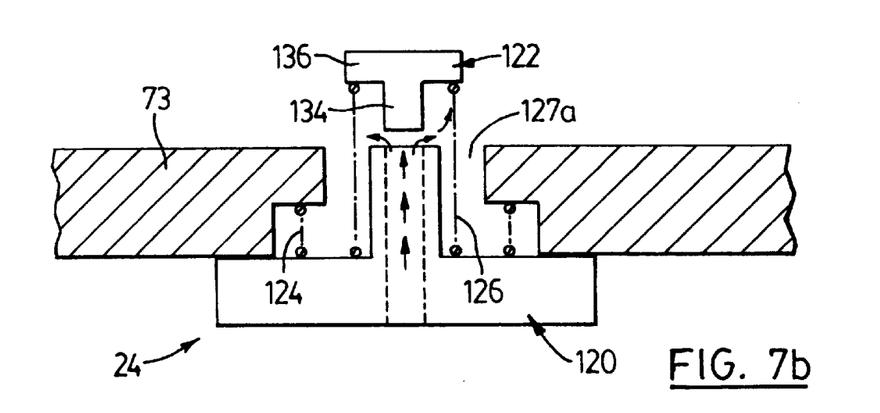
FIG. 7b is a cross-sectional view of the valve of FIG. 7a when the concentrator is supplying oxygen enriched air.
Figure 7C:
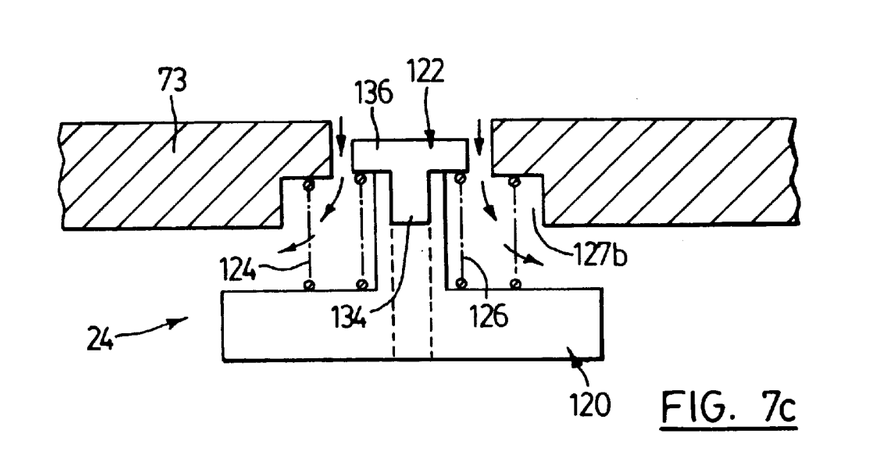
FIG. 7c is a cross-sectional view of the valve of FIG. 7a when the concentrator is in the purge cycle.

FIGS. 7a, 7b and 7c show an alternate embodiment of valve 24 as a two-way valve illustrated in cross section, which includes a first plug 120, a second plug 122, a first spring 124 and a second spring 126. Common wall 73 between adsorption chamber 16 and passageway 20 around adsorption outlet 72 has a "step" configuration as shown, and includes first recessed annular surface 125a, first cylindrical surface 125b, second cylindrical surface 125c, and second annular surface 125d. First cylindrical surface 125b defines a first port 127a and second cylindrical surface 125c defines a second port 127b.

First plug 120 comprises a first plug stem 128 and a first plug plate 130 and has a longitudinal bore 132 which extends through the body of plug 120. In its first position (FIG. 7a), first plug stem 128 extends along first and second cylindrical surfaces 125b and 125c and is sized such that sufficient room is left between the outside surface of first plug stem 128 and the first and second cylindrical surfaces 125b and 125c to accommodate first spring 124. First plug plate 130 has a larger diameter than that of second port 127b such that first plug plate 130 extends over second annular surface 125d to seal adsorption chamber 16 from passageway 20. First spring 124 is coupled between first annular surface 125a and the top surface of first plug plate 130 and urges first plug plate 130 into sealing arrangement with second annular surface 125d thus preventing fluid flow through adsorption outlet 72.

Second plug 122 comprises a second plug stem 134 and a second plug plate 136. Second plug stem 134 is adapted to fit within bore 132 of first plug 120. Second plug plate 136 has a smaller diameter than that of first port 127a such that sufficient clearance is available between the outer surface of second plug plate 136 and the first cylindrical surface 125b for movement of second plug plate 136 within adsorption outlet 127a. Second plug plate 136 is also sized to extend over the top surface of second valve stem 134 such that second spring 126 can be coupled to the bottom surface of second plug plate 136 and to the top surface of first plug plate 130. Accordingly, second spring 126 urges second plug plate 136 into sealing arrangement with the top surface of second valve stem 134 so as to prevent fluid flow through bore 132.

Referring specifically to FIG. 7a, while concentrator 10 is in its adsorption cycle, valve 24 will be in its first position. That is, the pressure differential between adsorption chamber 16 and passageway 20 will be such that first spring 124 prevents air from flowing from passage 20 into adsorption chamber 16 (plug 122 is fully engaged with first plug 120 to block bore 132 to prevent gas flow therethrough) and second spring 126 prevents air from flowing from adsorption chamber 16 to passageway 20 (first plug plate 130 will be sealably engaged over second port 127 to prevent gas flow through adsorption outlet 72).

Referring now to FIG. 7b, when a sufficiently high pressure forms within adsorption chamber 16 (e.g. 1 psig), valve 24 will be caused to move from its first position (FIG. 7a) to its second position (FIG. 7b). Specifically, once the pressure exerted on the bottom surface of second plug stem 128 of second plug 122 through bore 132 is larger than the resistance of second spring 126 and the pressure on the top surface of second plug plate 136, second spring 126 will be extended and second plug 122 will be lifted out of its engagement with first plug 120 such that second plug stem 128 will be removed from bore 132. Accordingly, gas will flow from adsorption chamber 16 into passageway 20 through bore 132 and around second plug 122.

Referring now to FIG. 7c, when the pressure within passageway 20 reaches a high enough value (e.g. 4–6 psig), valve 24 will be caused to move from its second position (FIG. 7b) to its third position (FIG. 7c). Specifically, once the pressure exerted on the top surface of second plug plate 136 of second plug 122 and the top surface of the first plug plate 130 is larger than the resistance of first spring 124 and the pressure on the bottom surface of first plug plate 130, second spring 126 will no longer be extended and first spring 124 will be extended such that first plug 120 will be forced away from adsorption outlet 72. Accordingly, enriched gas will flow from passageway 20 into adsorption chamber 16 through the space around engaged first and second plugs 120 and 122.

Figure 8B:
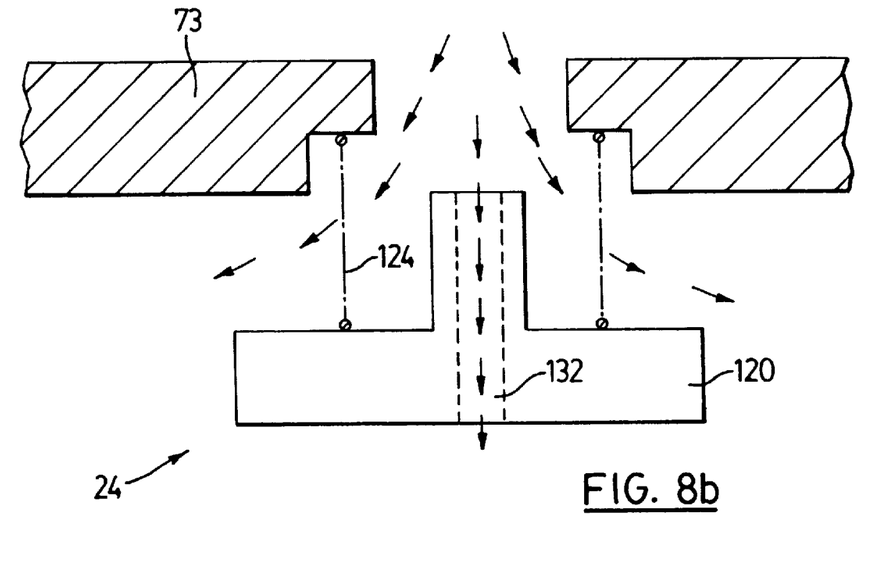

FIGS. 8a and 8b show an alternate embodiment of valve 24 as a two-way valve with a single spring configuration. In this embodiment, valve 24 comprises only first plug 120. While concentrator 10 is in its adsorption and charging cycles, valve 24 will be in a first position (FIG. 8a). During the adsorption cycle, as pressure builds up within adsorption chamber 16, plug plate 146 is further urged against annular surface 125d. It should be noted that in this position a first gas flow passes through bore 148 into passageway 20. During the charging cycle, valve 24 will remain in the first position as no amount of pressure in adsorption chamber 16 will cause an increased gas flow through valve 24 due to the fact that plug plate 146 extends over second port 127b.

Referring specifically to FIG. 8b, while concentrator 10 is in its purge cycle, valve 24 will move to the second position wherein gas will flow into adsorption chamber 16 from passageway 20 to effect a quick and efficient purge cycle. Once the purge cycle has been completed, the pressure of passageway 20 and adsorption chamber 16 will start to equalize until the pressure differential therein is such that spring 124 will no longer be caused to extend into adsorption chamber 16 causing plug to reassume its position within adsorption outlet 72 as shown in FIG. 8a.

It should be noted that the gas flow rate from adsorption chamber 16 into passageway 20 may be greater than, the same as or less than the gas flow rate in the reverse direction. The gas flow rates may be altered by varying the ratio of the surface area of the opening of valve 24 during the charging cycle compared to the surface area of the opening of valve 24 during the purge cycle (i.e. during the reverse flow).

By constructing a concentrator according to the instant invention, a concentrator may be constructed whereby the pressurized air fed to adsorption chamber 16 may be the only motive force to open purge valve 22 and valve 24. Further, it provides the requisite motive force to cause container 18 to expand. Thus, by using simple mechanical linkages and movable or expandable elements, a gas concentrator having a simple, rugged construction may be developed.

In addition, aperture 28 may be in an open position at all times so as to provide a continual supply of enriched gas to outlet 14 even when adsorption chamber 16 is being purged. This is due to reservoir 30 contracting during the purge cycle thereby driving the enriched stored gas from reservoir 30 to aperture 28.

Another advantage of the instant invention is that the expansion of container 18 may be used to time the purging cycle of adsorption chamber 16. Accordingly, electronic timers or concentration sensors are not required to provide input to a controller to determine when the purge cycle should be commenced or terminated.

What is claimed is:

1. A method for producing an enriched fluid stream having an increased concentration of a fluid from a fluid stream containing the first fluid and at least one second fluid comprising the steps of:

(a) the step of introducing the fluid stream into a vessel which contains a member for adsorbing the at least one second fluid;

(b) the step of pressurizing the vessel for a time sufficient for the member to adsorb at least a portion of the at least one second fluid to produce a first enriched fluid stream having an increased concentration of the first fluid;

(c) the step of venting the first enriched fluid at a first flow rate from the vessel through a mechanical venting valve;

(d) the step of using a portion of the first enriched fluid vented from the vessel to pressurize a pressurizable storage container; and, (e) the step of introducing enriched fluid stored in the pressurizable storage container into the vessel to purge the vessel.

2. The method as claimed in claim 1 further comprising the step of introducing a pressurized fluid stream into the vessel through the mechanical venting valve whereby the pressure of the fluid stream is the sole motive force for operating the mechanical venting valve.

3. The method as claimed in claim 1 further comprising the step of automatically venting the first enriched fluid from the vessel when the vessel reaches a first preset pressure.

4. The method as claimed in claim 3 further comprising the step of automatically purging the vessel when the pressurizable storage container reaches a second preset pressure.

5. The method as claimed in claim 4 further comprising the step of automatically providing first enriched fluid from the pressurizable storage container to the vessel when the pressurizable storage container reaches the second preset pressure.

6. The method as claimed in claim 1 further comprising the step of expanding the storage container as the storage container is pressurized.

7. The method as claimed in claim 1 further comprising the step of providing a portion of the first enriched fluid vented from the vessel as a source of the first enriched fluid.

8. The method as claimed in claim 1 further comprising the step of venting from the vessel during the purge cycle a stream enriched in the at least one second fluid and providing this as an enriched fluid stream.

9. A fluid concentrator for obtaining an enriched stream of a first fluid from a fluid stream containing the first fluid and at least one second fluid, the concentrator comprising:

(a) an adsorption chamber having an inlet for introducing the fluid stream to the adsorption chamber, the adsorption chamber operable to produce the enriched stream during a first cycle and the adsorption chamber having an outlet for venting the enriched stream from the adsorption chamber;

(b) a storage chamber positioned downstream from the adsorption chamber and in flow communication with the adsorption chamber for receiving at least a portion of the enriched fluid stream;

(c) a passageway connecting the adsorption chamber and the storage chamber in flow communication through a single valve to provide a first flow rate of the enriched fluid in the downstream direction and a second flow rate of the enriched fluid upstream to the adsorption chamber;

(d) an enriched fluid outlet in flow communication with at least one passageway for delivering a portion of the enriched fluid stream downstream of the concentrator; and, (e) a purge valve in flow communication with the inlet of the adsorption chamber and moveable between a closed position and an open position in which the adsorption chamber is purged by a portion of the enriched fluid stream during a purging cycle whereby during the first cycle the enriched fluid stream travels in the downstream direction through the single valve and during the purging cycle a portion of the enriched fluid stream travels in the upstream direction through the single valve into the adsorption chamber.

10. The concentrator as claimed in claim 9 wherein the single valve is operable to move between its open and closed positions in response to pressure differences upstream and downstream of the single valve and the purge valve is operable to move between its open and closed positions in response to pressure differences upstream and downstream of the purge valve.

11. The concentrator as claimed in claim 9 wherein the single valve comprises a venting valve moveable automatically from a first position in which the venting valve restricts the venting of the enriched fluid from the adsorption chamber into the passageway to a second position in which the venting valve vents the enriched fluid from the adsorption chamber into the passageway at an increased rate when the pressure in the adsorption chamber reaches a preset level.

12. The concentrator as claimed in claim 9 wherein the single valve is a mechanical valve which seals the adsorption chamber from the passageway due to the differential pressure between the adsorption chamber and the passageway when the pressure differential is less than a preset level.

13. The concentrator as claimed in claim 9 wherein the enriched fluid outlet has a flow restrictor associated therewith whereby the storage chamber is pressurized when the adsorption chamber vents enriched fluid into the passageway.

14. The concentrator as claimed in claim 9 wherein the storage chamber is drivingly connected to the purge valve whereby the storage chamber automatically causes the purge valve to be moved to the open position when the pressure within the storage chamber reaches a preset pressure.

15. The concentrator as claimed in claim 14 wherein the single valve is automatically moveable to a position in which the at least one valve vents enriched fluid from the passageway to the adsorption chamber when the pressure differential between the adsorption chamber and the passageway is less than a preset level.

16. The concentrator as claimed in claim 9 wherein the single valve is automatically operable to vent enriched fluid from the adsorption chamber into the passageway when the pressure differential between the adsorption chamber and the storage chamber reaches a first preset level, and the single valve is automatically operable to direct enriched fluid from the passageway into the adsorption chamber when the pressure differential between the adsorption chamber and the storage chamber reaches a second preset level.

17. The concentrator as claimed in claim 9 wherein the storage chamber is part of the passageway.

18. The concentrator as claimed in claim 9 wherein the storage chamber is expandable.

19. The concentrator as claimed in claim 18 wherein the storage chamber has a member moveable in response to elevated pressure in the storage chamber.

20. The concentrator as claimed in claim 18 wherein at least the portion of one wall of the storage chamber is deformable at elevated pressure in the storage chamber.

21. A fluid concentrator for obtaining an enriched stream of a first fluid from a fluid stream containing the first fluid and at least one second fluid, the concentrator comprising:

(a) an adsorption chamber having an inlet for introducing the first fluid stream to the adsorption chamber, the adsorption chamber operable to produce the enriched fluid stream during a first cycle and the adsorption chamber having an outlet for venting the enriched fluid stream from the adsorption chamber;

(b) an enriched fluid supply conduit positioned downstream from the adsorption chamber and in flow communication with the adsorption chamber for receiving at least a portion of the enriched fluid stream (c) a mechanical valve intermittently connecting the adsorption chamber in flow communication with the enriched fluid supply conduit; and, (d) a purge valve in flow communication with the adsorption chamber and moveable between a closed position and an open position in which the adsorption chamber is purged during the purge cycle.

22. The concentrator as claimed in claim 21 further comprising a pressurizable storage chamber positioned downstream from the adsorption chamber and in flow communication with the adsorption chamber for receiving at least a portion of the enriched fluid stream and at least one passageway connecting the adsorption chamber and the storage chamber in flow communication through the mechanical valve.

23. The concentrator as claimed in claim 22 wherein the mechanical valve is operable to move between its open and closed positions in response to pressure differences upstream and downstream of the mechanical valve and the purge valve is operable to move between its open and closed positions in response to pressure differences upstream and downstream of the purge valve.

24. The concentrator as claimed in claim 22 wherein the mechanical valve comprises a venting valve moveable automatically from a first position in which the venting valve restricts the venting of the enriched fluid from the adsorption chamber into the passageway to a second position in which the venting valve vents the enriched fluid from the adsorption chamber into the passageway at an increased rate when the pressure in the adsorption chamber reaches a preset level.

25. The concentrator as claimed in claim 22 wherein the storage chamber is drivingly connected to the purge valve whereby the storage chamber automatically causes the purge valve to be moved to the open position when the pressure within the storage chamber reaches a preset pressure.

26. The concentrator as claimed in claim 22 wherein the storage chamber is expandable.

27. The concentrator as claimed in claim 26 wherein at least the portion of one wall of the storage chamber is deformable at elevated pressure in the storage chamber.

28. A pressure swing adsorption apparatus for producing an enriched fluid stream of a first fluid from a stream containing the first fluid and at least one second fluid, the apparatus including:

(a) reversible adsorption means for reversibly adsorbing the at least one second fluid to produce the enriched fluid stream;

(b) pressurizable storage means for receiving and storing a portion of the enriched fluid stream;

(c) outlet means in flow communication with the adsorption means for venting a portion of the enriched fluid stream from the apparatus;

(d) mechanical valve means for alternately providing a first flow rate of the enriched fluid stream downstream from the adsorption means to pressurize the pressurizable storage means, and a second flow rate of the enriched fluid stream upstream into the adsorption means to purge the adsorption means;

(e) purging means for removing at least a portion of the at least one second fluid from the reversible adsorption means when the valve means is providing the second flow rate of the enriched fluid stream into the adsorption means.

29. The apparatus as claimed in claim 28 wherein the adsorption means operates under pressure and the mechanical valve means is automatically actuated to vent enriched fluid at a first flow rate from the adsorption means when the adsorption means reaches a pressure sufficient for at least a portion of the second fluid to be adsorbed.

30. The apparatus as claimed in claim 28 wherein the adsorption means operates under pressure and the mechanical valve means is automatically actuated to vent enriched fluid at a first flow rate from the adsorption means when the adsorption mean reaches a preset pressure.

31. The concentrator as claimed in claim 30 further comprising means to increase the pressure in the storage means when the adsorption means vents enriched fluid.

32. The apparatus as claimed in claim 31 wherein the storage means operates under pressure and the mechanical valve means is automatically actuated to vent enriched fluid at a second flow from the storage means to the adsorption means when the storage means reaches a preset pressure.

33. The apparatus as claimed in claim 28 further comprising actuating means operatively connecting the pressurizable storage means to the purging means whereby the purging means is actuated when the pressure of the pressurizable storage means reaches a preset pressure.

34. The apparatus as claimed in claim 33 wherein the actuating means comprises a mechanical linkage.

35. The apparatus as claimed in claim 28 wherein apparatus further comprises means for pressurizing the adsorption means and the means for pressurizing the adsorption means comprises essentially the sole motive force to operate the apparatus.

* * * * *